United States Patent [19]

Tashiro et al.

[11] 4,058,037

[45] Nov. 15, 1977

[54] FULL ROTATION TYPE, SHEET WEB SHEARING MACHINE

[75] Inventors: Sadaji Tashiro; Yasuyuki Kuroi, both of Kumagaya, Japan

[73] Assignee: Hitachi Metals, Ltd., Japan

[21] Appl. No.: 668,302

[22] Filed: Mar. 18, 1976

[51] Int. Cl.² .............................................. B26D 5/00
[52] U.S. Cl. ........................................ 83/70; 83/334; 83/509; 83/349
[58] Field of Search .................. 83/70, 334, 335, 285, 83/298, 299, 354, 509

[56] References Cited

U.S. PATENT DOCUMENTS

| | | | |
|---|---|---|---|
| 1,894,815 | 1/1933 | Biggert, Jr. et al. | 83/334 X |
| 2,193,259 | 3/1940 | Sheperdson | 83/334 X |
| 3,057,239 | 10/1962 | Teplitz | 83/285 X |
| 3,543,624 | 12/1970 | Richards | 83/298 X |
| 3,628,410 | 12/1971 | Shields | 83/335 X |
| 3,771,399 | 11/1973 | Aterianus | 83/348 |

Primary Examiner—Willie G. Abercrombie
Attorney, Agent, or Firm—Craig & Antonelli

[57] ABSTRACT

A full rotation type, sheet web shearing machine comprising a rotary blade with a shearing edge, a stationary blade with a shearing edge, a motor for driving and braking the rotary blade, a cam for detecting a rotation angle of the rotary blade and gears for reducing the revolution speed of the motor. The full rotation type, sheet web shearing machine may cut sheet web to a given length. Owing to one full rotation of the rotary blade, it can cut the sheet web running continuously at a high speed without jam. The rotary blade is rotated, through gears driven by the motor and also is braked by making a braking circuit between electrical terminals of the motor so that the rotary blade is stopped at a predetermined angle.

28 Claims, 7 Drawing Figures

FULL ROTATION TYPE, SHEET WEB SHEARING MACHINE

This invention relates to a small scale sheet web shearing machine utilized in a business machine, such as a copy machine and a facsimile.

The prior art to which the invention is directed includes the art of shearing machine being of a "guillotine" type in which a moving blade moves straightly and of a "rotary" type in which a rotary blade rotates to a given angle and returns to a beginning position. In such prior art there are defects in a short life time of the shearing edge owing to two touchings per one cutting between a moving blade and a stationary blade and in jamming at a high speed of sheet web feed. That results that a maximum speed of sheet web feed is only 3 m/min. in the "guillotine" type or the "rotary" type shearing machine using a plunger solenoid. In order to increase a speed of the sheet feed, a full rotation type, sheet web shearing machine has developed as described in the commonly assigned copending U.S. Patent application, Ser. No. 613,499 filed on Sept. 15, 1975. It is important for a rotary blade of such a full rotation type shearing machine to stop at the same position after shearing. If not, the sheet sizes cut by the rotary blade are varied because a period from starting rotation to shearing is not fixed.

It is an object of the present invention to provide a high speed sheet web shearing machine to be able to stop a movable blade at a predetermined position exactly.

Another object of the present invention is to provide a sheet web shearing machine having a small size, which is light in weight and is mechanically simple and uncomplicated to manufacture.

A further object of the present invention is to provide a sheet web shearing machine which has an ability of cutting a sheet web precisely and is reliable for operation.

A further object of the present invention is to provide a noiseless sheet web shearing machine which can cut a sheet web without impact noise.

A full rotation type, sheet web shearing machine according to the present invention comprises a rotary blade having a shearing edge mounted on a rotatable cylindrical shank, a stationary blade having a shearing edge adapted to elastically contact the edge of the rotary blade, a motor rotating the rotary blade through a revolution transmitting member, a position detector of the rotary blade and an electrical circuit for supplying an electrical power to the motor and for braking the motor. The electrical circuit connecting between the motor and a power source comprises a circuit for braking the motor when the position of the rotary blade reaches a predetermined angle.

Figure 1:
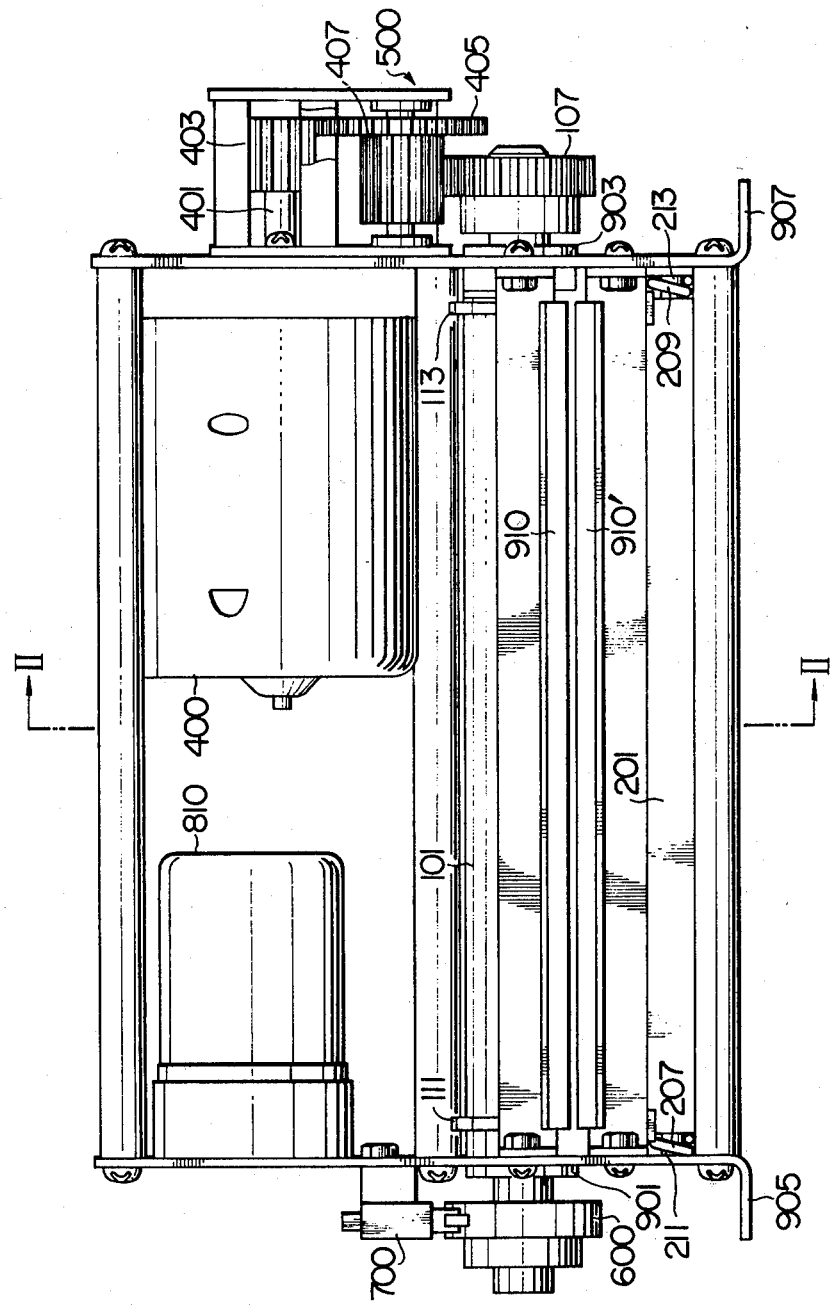
FIG. 1 is a plan view of a sheet web shearing machine embodying the concepts of the present invention.
Figure 2:
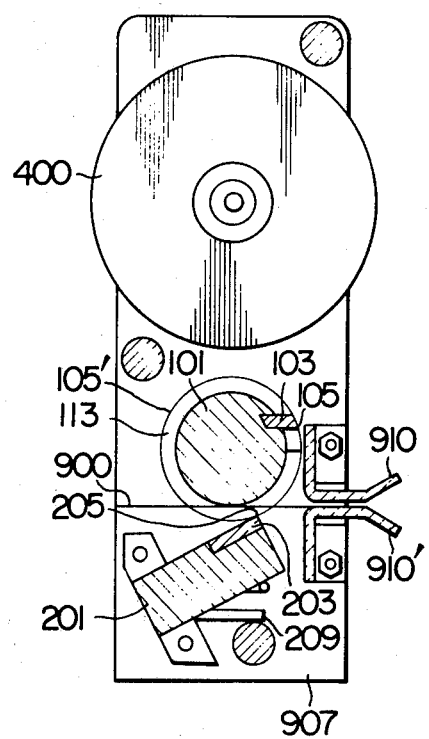
FIG. 2 is a cross-sectional side view through section II—II of FIG. 1.
Figure 3:
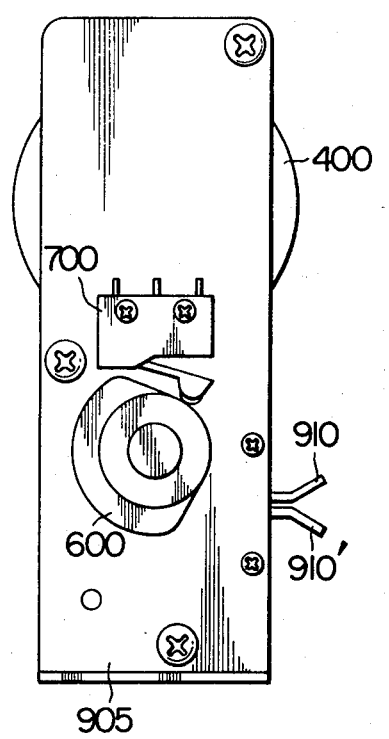
FIG. 3 is a side-elevational view of the shearing machine.

Referring to FIGS. 1, 2 and 3, a full rotation type, sheet web shearing machine according to the present invention contains a cylindrical shank 101 providing a rotary blade 103 with a shearing edge 105, a stationary shank 201 with a shearing edge 205 which elastically contact the edge 105 by springs 207, 209, a motor 400 for rotating the rotary blade 103 through a revolution transmitting member 500, a trapezoid formed cam 600 mounted on one end of a shaft of the cylindrical shank 101 which co-rotates with the shank, a small switch 700 having a lever with a roller for following an outer surface of the cam 600 and a control switch 810 constituting a part of an electric circuit for supplying the motor 400 with electric power. Any type of motors may be used as the motor 400. For the present invention, it is preferable that the motor is a D.C. motor which may be stopped rapidly when a short circuit between extending leads of the motor is made. A D.C. motor having a stator with permanent magnets may self-generate an electric power between the leads when the short circuit is made therebetween, so rapid stopping of the motor is possible.

In the shearing machine according to the present invention, a sheet web 900 to be cut is introduced into a cutting position between the two blades through guide plates 910, 910', when the sheet web proceeds by a predetermined length, the rotary blade 103 rotates to shear the sheet web.

The cylindrical shank 101 is journaled in bearings 901, 903 fitted in side plates 905, 907 and the shaft of the shank 101 extends outwardly on both opposite sides of the shank 101. The cam 600 is mounted on the left-hand end of the shaft. A gear 107 is mounted on the right-hand end of the shaft. The gear 107 constitutes parts of the revolution transmitting member 500 through which a driving of the motor 400 is transmitted to the cylindrical shank 101. The cylindrical shank 101 is provided with a rotary blade 103 of which a shearing edge 105 projects from the outer surface of the shank and with guide rings 111, 113 mounted at each end of the shank 101. The guide rings 111, 113 are disposed in closely contacting relation to each shearing starting end of the edge 105. The radius of the rings 111, 113 is in coincidence with that of cylinder 105' formed by rotation of the edge.

The stationary shank 201 having a stationary blade 203 is mounted on supporting shafts 211, 213 journaled in the side plates 905, 907. A shearing edge 205 of the stationary blade 203 is adapted to be brought into pressure-contact with the edge 105 of the rotary blade 103 by a tension of springs 207, 209 disposed around the shafts 211, 213 whereby a rotation of the cylindrical shank 101 causes cutting a sheet web. The shearing edge 205 further contacts outer surfaces of the guide rings to make a gap between the cylindrical shank 101 and the edge 205 and to eliminate a shock and a noise produced by collision of the shearing edge 105 and the shearing edge 205.

The motor 400 for driving the cylindrical shank 101 is disposed on the side plate 907. A shaft 401 of the motor extends outwardly through the side plate 907. A pinion 403 mounted on the shaft 401 engages with a reduction gear 405 coaxially secured to a pinion 407 which engages with the gear 107 mounted on the shaft of the rotary blade 103. The pinions 403, 407 and the gears 405, 107 constitute the revolution transmitting member 500. The trapezoid formed plate cam 600 is mounted on one extending end of the shaft of the cylindrical shank 101. The plate cam 600 is spreading out like an unfolded fan. During one rotation of the cam, the roller of the small switch 700 passes one upper dwell point and one lower dwell point, following an outer surface of the cam 600. The small switch 700 comprises an A-contact point and a B-contact point. The A-contact point will be closed at the upper dwell point. In turn, the B-contact point will be closed at the lower dwell point. On the waiting time of the rotary blade, the roller is on the lower dwell point, so the switch contacts the B-contact point. According to a rotation of the rotary blade, the switch changes the B-contact point to the A-contact point and then the A-contact point to the B-contact point. As mentioned-above, the cam 600 can indicate a rotation angle of the rotary blade 103 proceeding from the beginning position.

Figure 4:
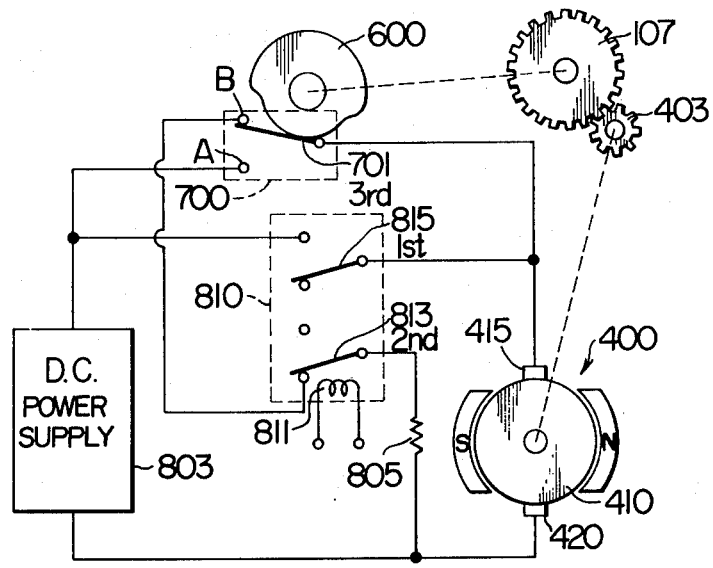
FIG. 4 is a schematic wiring illustration of the present invention.

The electric circuit for supplying the motor 400 with electric power is shown in a schematic wiring illustration of FIG. 4 which contains the motor 400, the small switch 700, the control switch 810 and a D.C. power supply 803. In FIG. 4, the control switch 810 is a magnetic relay and has two relays, a first relay being normally open and a second relay being normally closed, to be operated simultaneously by a magnetic coil 811 excited by an external electrical pulse which is a cutting order pulse having a predetermined width and a predetermined height provided by a pulse making circuit (which is undrawn). Referring the small switch 700 as a third relay, the A-contact point of the third relay and the first relay are connected in parallel between the D.C. power supply 803 and the D.C. motor 400. The second relay 813 and the B-contact point of the third relay 700 are connected in a series between two extending leads of an armature of the D.C. motor 400 and may make a short circuit between the leads through a damping resistance 805.

On waiting condition, the roller is at the lower dwell point so the third relay 700 connects with the B-contact point. Also the second relay of the control switch 810 is closed then. Since the leads of the motor 400 make a short circuit through these relays and the resistance 805, the motor is braked by the short circuit.

Figure 5:
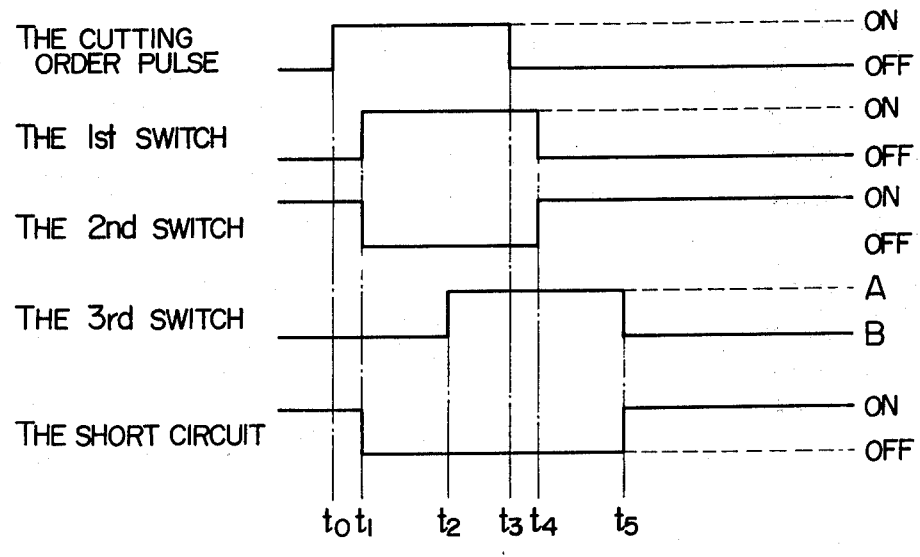
FIG. 5 shows a timing diagram of the present invention.

We explain the movement of the full rotation type, sheet web shearing machine referring to a timing diagram of the cutting order pulse, the first relay, the second relay, the third relay and the short circuit shown in FIG. 5.

At a point $t_0$, the magnetic coil 811 receives an external electrical pulse, or the cutting order pulse. Because of that, the first and second relays are operated at a time of $t_1$ delayed a little from $t_0$. Since the second relay become open, the short circuit is made "off". Simultaneously the first relay becomes closed so the motor begins rotating.

According to the rotation of the cam 600, the roller rises to the upper dwell point and the third relay changes the B-contact point to the A-contact point. The D.C. motor is supplied with an electric power through the A-contact point of the third relay, too.

Since the cutting order pulse is eliminated after a period of the pulse width, the first relay becomes open and the second relay becomes closed again. The rotation of the rotary blade, however, continues because the third relay connects with the A-contact point.

When the angle of the rotary blade reaches a predetermined angle (at $t_5$ in FIG. 5), the roller of the small switch 700 falls down to the lower dwell point. Then the A-contact point of the third relay is open so that an electric power supply is stopped. In turn, the third relay changes to the B-contact point to make a short circuit between two leads of the armature of the D.C. motor which is dynamically braked and is brought to a halt.

If it is estimated how much angle the rotary blade rotates by inertia after braking, it may be brought exactly at a predetermined angle to a halt.

The other type of motors may be used as a motor instead of a D.C. motor mentioned in the above embodiment. An induction motor may be used in the full rotation type, sheet web shearing machine of the present invention.

In case of an induction motor, an A.C. electric source is used in place of the D.C. electric source, and a D.C. electric source is used in place of the short circuit.

Figure 6:
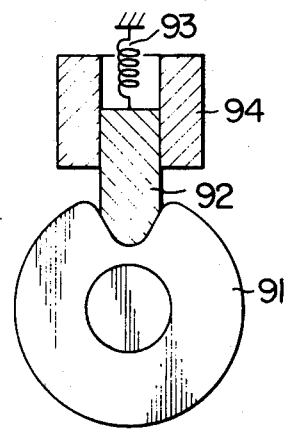
FIG. 6 is an explanatory illustration of a mechanical stopper in the shearing machine.
Figure 7:
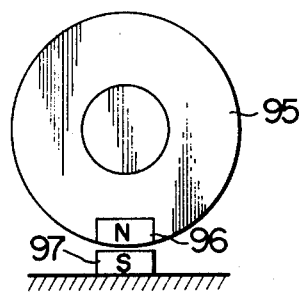
FIG. 7 is an explanatory illustration of a magnetic stopper in the shearing machine.

The shearing machine may further comprise a mechanical stopper or a magnetic stopper to get a stable stop in the waiting condition. The stopper is mounted on a shaft of the rotary blade. In FIG. 6, a mechanical stopper comprises a stopper disk 91 which has a groove on a spherical surface thereof, a stopper rod 92 for inserting the groove and a spring 93 yielding a tension to the rod. The rod is slidably inserted in a sleeve 94 which is disposed in position on a frame of the shearing machine. When the driving force of the motor becomes beyond a friction between the groove and the rod, the rotary blade begins rotating. After one rotation of the rotary blade, it is brought at a predetermined angle to a halt by both dynamic brake and the mechanical stopper. A magnetic stopper shown in FIG. 7 may be used as a stopper in place of the mechanical stopper. The magnetic stopper comprises a stopper disk 95 which has a magnet 96 mounted thereon and a stationary magnet 97 disposed in position on a frame of the shearing machine.

What is claimed is:

1. A full rotation type, sheet web shearing machine comprising;
    a rotary blade having a shearing edge mounted on a rotatable cylindrical shank,
    a stationary blade having a shearing edge elastically contacting the edge of the rotary blade, the stationary blade shearing the sheet web with the rotary blade,
    means for driving the rotary blade,
    means for detecting a rotation angle from a starting position of the rotary blade,
    means for braking the rotary blade and means for sending a timing signal of braking to the means for braking and to the means for driving as the rotation angle coincides with a preset angle, so as to bring the rotary blade at a predetermined angle to a halt.

2. A full rotation type, sheet web shearing machine according to claim 1, wherein the means for driving comprises;
    a starting circuit for receiving an external electrical pulse having a predetermined width to start rotating a motor and a preserving circuit for supplying the motor with electric power to continue rotation of the motor after starting rotating and cutting the supply of electric power as the rotation angle coincides with a predetermined angle.

3. A full rotation type, sheet web shearing machine according to claim 2, wherein the holding circuit cuts the supply of the electric power as receiving the timing signal of braking from the means for sending.

4. A full rotation type, sheet web shearing machine according to claim 2, wherein a permanent magnet D.C. motor is utilized as both the motor of the means for driving and the means for braking.

5. A full rotation type, sheet web shearing machine according to claim 4, wherein the D.C. motor is braked by short-circuiting between extending leads of an armature thereof.

6. A full rotation type, sheet web shearing machine according to claim 5 further comprising a relay for making the short-circuit open when the electric power is supplied to the D.C. motor.

7. A full rotation type, sheet web shearing machine according to claim 2, wherein an induction motor is utilized as both the motor of the means for driving and the means for braking.

8. A full rotation type, sheet web shearing machine according to claim 7, wherein the induction motor is braked by supplying an armature thereof with D.C. electric power.

9. A full rotation type, sheet web shearing machine according to claim 8, further comprising a relay for making a D.C. current source open when A.C. electrical power is supplied to the inductor motor.

10. A full rotation type, sheet web shearing machine according to claim 2, further comprising a mechanical stopper mounted on a shaft of the rotary blade to hold stationarily the rotary blade in position.

11. A full rotation type, sheet web shearing machine according to claim 2, further comprising a magnetic stopper mounted on a shaft of the rotary blade to hold stationarily the rotary blade in position.

12. A full rotation type, sheet web shearing machine comprising:
a rotary blade having a shearing edge mounted on a rotatable cylindrical shank;
a stationary blade having a shearing edge and being biased against said rotary blade so as to coact with said rotary blade to shear a sheet web therebetween;
means for driving said rotary blade;
means for braking said rotary blade; and
control means associated with said driving means and said braking means including first means for energizing said driving means upon receipt of a cutting order signal, second means for holding said driving means in an energized condition after the cutting order signal is stopped, and third means for detecting a predetermined rotating position of said rotary blade and for de-energizing said driving means and for actuating said braking means on detecting said predetermined rotating position.

13. A full rotation type, sheet web shearing machine according to claim 12, wherein said driving means and said braking means comprise a common permanent magnet D.C. motor.

14. A full rotation type, sheet web shearing machine according to claim 13, wherein said braking means comprises said permanent magnet D.C. motor and a short circuit means for shorting an armature of said D.C. motor.

15. A full rotation type, sheet web shearing machine according to claim 14, wherein said first means comprises a D.C. power supply, a power supply circuit means for connecting said power supply to said armature, and a first relay provided in said power supply circuit means to open and close said power supply circuit means, said first relay being adapted to close said power supply circuit means upon a receipt of the cutting order signal.

16. A full rotation type, sheet web shearing machine according to claim 15, wherein said short circuit means includes a second relay operatively interconnected with said first relay so as to close said short circuit means only when said first relay is in an open position.

17. A full rotation type, sheet web shearing machine according to claim 16, wherein a further circuit means is disposed between said power supply and said armature, said further circuit means being in parallel to said first relay, said second and third means including a third relay means movable between a first position wherein said short circuit means is opened and said first relay is closed and a second position wherein said short circuit means is closed and said further circuit means is opened, and a cam means for shifting said third relay means, said cam means being operatively connected to said rotary blade to rotate in accordance with the rotation of said rotary blade.

18. A full rotation type, sheet web shearing machine according to claim 13, wherein said driving means and said braking means comprises a common induction motor.

19. A full rotation type, sheet web shearing machine according to claim 13, wherein said braking means comprises an induction motor, a D.C. electric power supply, and a first circuit for conncting said D.C. electric power supply to an armature of said induction motor.

20. A full rotation type, sheet web shearing machine according to claim 19, wherein said first means comprises an A.C. power supply, a second circuit for connecting said A.C. power supply to said armature, and a first relay provided in said second circuit to open and close said second circuit, said first relay being adapted to close said second circuit upon receipt of a cutting order signal.

21. A full rotation type, sheet web shearing machine according to claim 20, wherein said first circuit includes a second relay operatively interconnected to said first relay so as to close said first circuit only when said first relay is open.

22. A full rotation type, sheet web shearing machine according to claim 21, wherein a further circuit means is disposed between A.C. power supply and said armature, said further circuit means being disposed in parallel to said first relay, said second and third means including a third relay movable between a first position wherein said first circuit is opened and said further circuit means is closed and a second position wherein said first circuit is closed and said further circuit means is opened, and a cam means for shifting said third relay means between the first and second position, said cam means being operatively connected to said rotary blade to rotate in accordance with the rotation of said rotary blade.

23. A full rotation type, sheet web shearing machine according to claim 12, further comprising a mechanical stopper means mounted on a shaft of the rotary blade for holding the rotary blade in a stationary position.

24. A full rotation type, sheet web shearing machine according to claim 13, further comprising a mechanical stopper means mounted on a shaft of the rotary blade for holding the rotary blade in a stationary position.

25. A full rotation type, sheet web shearing machine according to claim 17, further comprising a mechanical stopper means mounted on a shaft of the rotary blade for holding therotary blade in a stationary position.

26. A full rotation type, sheet web shearing machine according to claim 12, further comprising a magnetic stopper means mounted on a shaft of the rotary blade for holding the rotary blade in a stationary position.

27. A full rotation type, sheet web shearing machine according to claim 13, further comprising a magnetic stopper means mounted on a shaft of the rotary blade for holding the rotary blade in a stationary position.

28. A full rotation type, sheet web shearing machine according to claim 17, further comprising a magnetic stopper means mounted on a shaft of the rotary blade for holding the rotary blade in a stationary position.

* * * * *